I. E. PALMER.
SPRING BED OR SEAT.
APPLICATION FILED SEPT. 18, 1908.
955,350.
Patented Apr. 19, 1910.
2 SHEETS—SHEET 1.
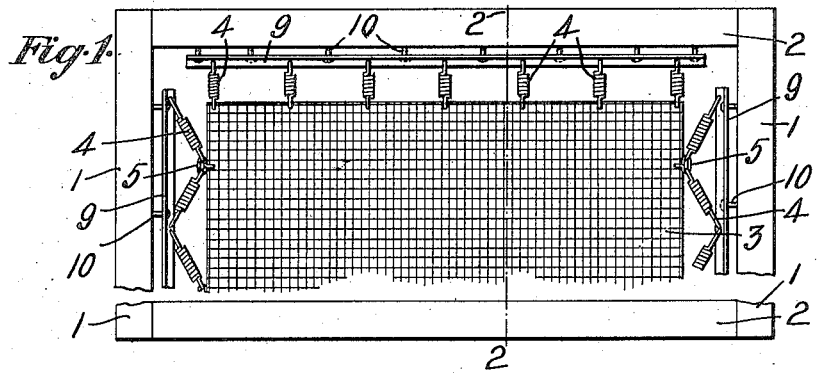
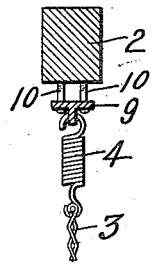
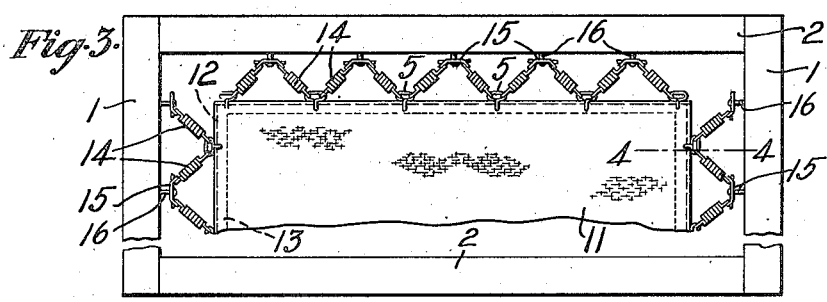
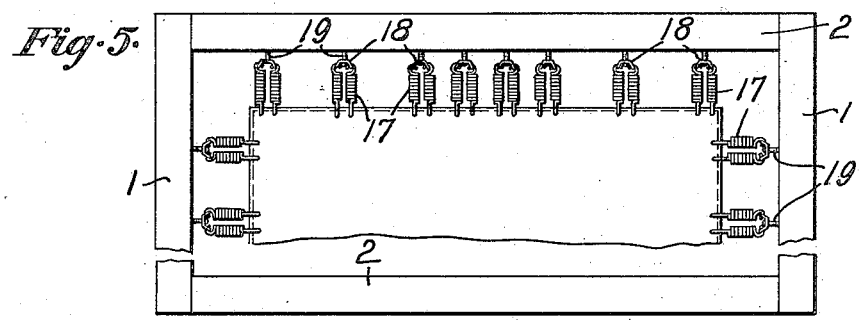
Witnesses:
Walter L. ———
Robert H. Kammler.
Inventor:
Isaac E. Palmer,
by Emery and Booth, Attys

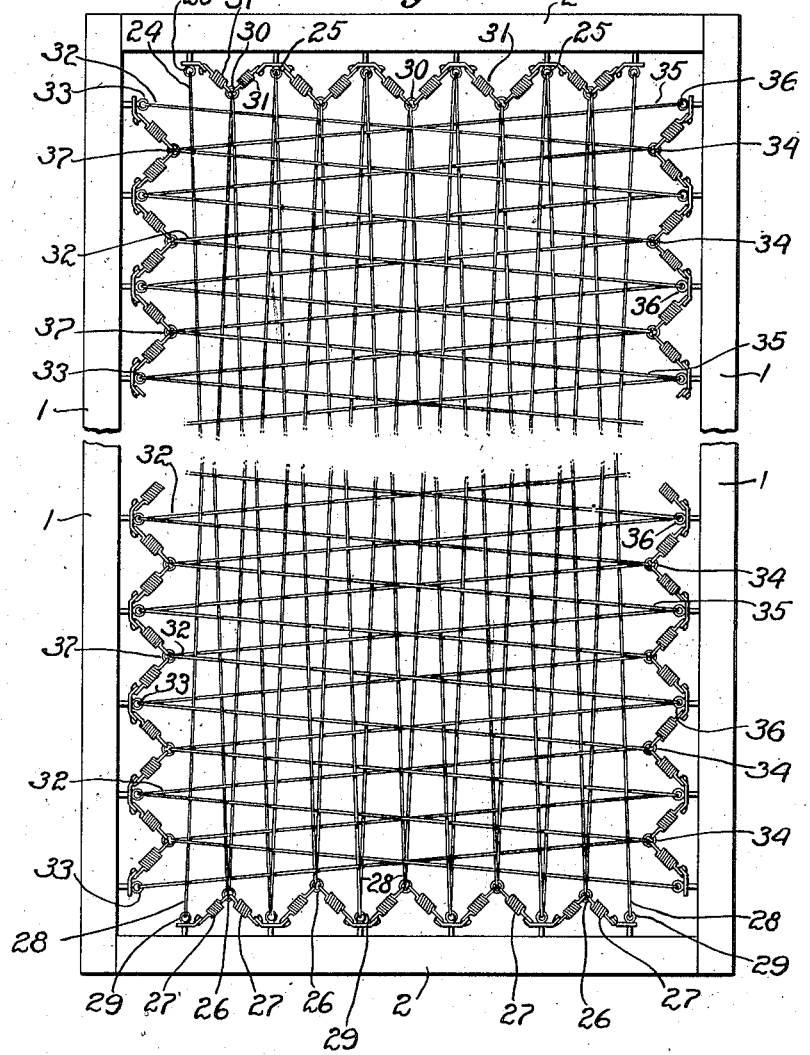

UNITED STATES PATENT OFFICE.

ISAAC E. PALMER, OF MIDDLETOWN, CONNECTICUT, ASSIGNOR TO THE I. E. PALMER CO., OF MIDDLETOWN, CONNECTICUT, A CORPORATION OF CONNECTICUT.

SPRING BED OR SEAT.

955,350.

Specification of Letters Patent.

Patented Apr. 19, 1910.

Application filed September 18, 1908. Serial No. 453,576.

*To all whom it may concern:*

Be it known that I, ISAAC E. PALMER, a citizen of the United States, residing at Middletown, in the county of Middlesex and State of Connecticut, have invented an Improvement in Spring Beds or Seats, of which the following description, in connection with the accompanying drawings, is a specification, like numerals on the drawings representing like parts.

This invention relates to spring supports which may be used as a spring bed or seat of general application, or may be used as a frame independent of a hammock body, but adapted to be engaged therewith to determine the form thereof when suspended.

In order that the principles of my invention may be readily understood, I have disclosed a single type or embodiment thereof in the accompanying drawings, wherein—

Figure 1 is a plan view of a portion of a spring support embodying one form of my invention; Fig. 2 is a longitudinal sectional view upon the line 2—2 of Fig. 1; Fig. 3 is a plan view of a portion of another form of spring support embodying my invention; Fig. 4 is a detail of a hook employed in connection with my invention; Fig. 5 is a detail view of a portion of a modified form of my invention; and Fig. 6 is a plan view of a form of my invention employing interlaced cords.

The frame forming a part of my invention is preferably composed of longitudinal or side members 1—1 and end members 2—2 connected thereto in any suitable manner. The said frame may be constructed of any suitable material, but preferably of wood. Although the invention is of general application and may be employed in connection with beds or other devices to afford a suitable support or seat, it may also be used in connection with hammocks in the manner disclosed in my Patent No. 574,073, December 29, 1896, and in my copending application No. 423,914, filed March 28, 1908. In the event that the invention is employed in connection with hammocks, the end members of the frame are preferably provided with cross bars or bearings spaced from and connected to the frame by corner brackets or otherwise as more fully disclosed in the said application.

Any suitable support or seating may be employed in connection with the frame. Herein I have represented a seating of textile material both in woven form and formed from an interlaced cord or cords and also one of wire netting, but it will be understood that any desirable material may be utilized for this purpose, as, for example, such as shown in Figs. 4 and 11 of my application Serial No. 423,914, filed March 28, 1908. In the construction shown in Fig. 1, I have indicated a wire netting support 3. Intermediate the edges thereof and preferably both the end and side members of the frame are a suitable number of springs 4 preferably connected to the wire netting by hooks 5, each of which, as more clearly shown in Fig. 4, has an eye 6 and a looped portion 7 terminating in a point 8 to penetrate the support 3, as indicated in Fig. 1. In the event that I employ wire netting, I find in practice that it is unnecessary to employ a spreader inserted in or attached to the edges of the material, but the same may be employed if desired. I contemplate connecting the springs 4 either to the support or seating or to the frame in such manner as to permit the adjustment of the springs, preferably without disconnecting them, so that any undesirable slackness that may occur in the use of the invention may be readily taken up. In the form of the invention disclosed in Fig. 1, this is accomplished by providing a T rail 9 along both sides and ends of the frame to which the ends of the springs 4 are suitably connected to the frame by screws 10. While in Fig. 1 I have represented the side springs as inclined and the other springs as normal to the edge of the T rail, it will be understood that in either case the springs may be arranged as desired. Instead of employing the rail or rails, the seat may be supported as shown in other figures.

In the form of the invention illustrated in Fig. 3, I have represented a textile seating or support 11, though it will be understood that a wire netting or other suitable support may be employed. Preferably, in the event of the use of a woven or other textile support, spreader rods 12 are employed located within suitable hems 13. Springs 14 are connected in suitable manner permitting adjustment thereof with respect to the support or seating and the frame, and in this form of the invention at one end by hooks 5 penetrating the seating as disclosed more fully in Fig. 4, and at the other end by preferably bent tightening plate links 15 with holes in the ends whereof the springs are engaged. The said plate links are adjustably connected with the members of the frame by screws 16 passing through centrally arranged holes therein.

In the form of the invention represented in Fig. 5, the springs 17 connecting the members of the frame with the support or seating are positioned normal to that member to which they are connected and preferably in pairs as clearly indicated, in which event both members of a pair of springs are connected at one end in any suitable manner to the seating, as by passing the looped ends of the springs through the material thereof and at the other end to plate links 18 adjustably connected by screws 19 to the frame. It is apparent that, in the form of the invention shown in Fig. 5, the inner ends of the springs may be connected to the support or seating by hooks 5. If desired, the springs in the various forms of the invention may be arranged at equal distances apart, or they may be arranged at unequal distances, as, for example, more closely at or toward the middle of the end or side members. In Fig. 5, I have represented the springs as more closely arranged at the middle portion of the end member.

While in Figs. 1 to 5 inclusive, I have represented coil springs, it will be understood that any suitable type of spring may be employed.

In Fig. 6, I have shown a form of my invention wherein a seating of interlaced strands, preferably cords, is provided, means being also provided for taking up slack in the strands or adjusting the tension thereof as may be required. While in said figure I have shown the type of adjustment represented in Fig. 3, it will be understood that any suitable adjusting means may be provided. Preferably both longitudinal and transverse strands may be provided, though in certain types of my invention either may be found sufficient. In said Fig. 6 I have represented a longitudinal strand, preferably a cord 24, extending from a fixed eye 25 at one end of the frame to an eye 26 at the other end, the eye 26 being yieldingly supported by the springs 27, the tension of which may be adjusted in the manner already described in connection with Fig. 3. From the eye 26 the cord 24 is returned to a second fixed eye 25 and passes thence to a second yieldingly supported eye 26, the cord being passed back and forth to the desired extent. Preferably, a strand 28 is connected at one end to the fixed eye 29 at the end of the frame opposite the fixed eye 25 and to the eye 30 yieldingly supported by the springs 31, the strand being passed back and forth to the desired extent, and the tension being adjusted in the manner already described. If transverse strands be provided, I preferably employ a similar construction. As shown, the strand 32 passes back and forth between the fixed eyes 33 at one side and the yieldingly supported eyes 34 at the opposite side, and the strand 35 passes back and forth between the fixed eyes 36 at one side and the yieldingly supported eyes 37 at the opposite side. Although one or more of the cords or strands may be yieldingly supported at both sides or ends of the frame, I prefer to support each of them fixedly at one side or end of the frame to prevent chafing of the strand in the eyes.

Having thus described one type or embodiment of my invention, I desire it to be understood that although specific terms are employed, they are used in a generic and descriptive sense and not for purposes of limitation, the scope of the invention being set forth in the following claims.

Claims.

1. A spring bed or seat comprising in combination a frame composed of longitudinal and end members, a seating therefor, hooks engaging an edge or edges of said seating, springs connected to said hooks, plate links to which said springs are directly connected, and screws directly connecting said plate links to said frame.

2. A spring bed or seat comprising in combination a frame composed of longitudinal and end members, a seating therefor, hooks engaging an edge or edges of said seating, springs connected to said hooks, perforated plate links to perforations in which said springs are connected, and adjusting, holding screws also passing through perforations in said plate links and directly engaging the frame and adjustably securing them thereto.

3. A spring bed or seat comprising in combination a frame composed of longitudinal and end members, a seating therefor, springs arranged in pairs and connected to an edge or edges of said seating, plate links to which an end of each member of a pair of said springs is directly connected, and screws directly engaging said links and directly engaging the frame and adjustably securing them thereto.

4. A spring bed or seat comprising in combination a frame composed of longitudinal and end members, a seating therefor, springs arranged in pairs, the members of each pair being inclined toward each other, common means for connecting the inner ends of members of adjacent pairs of said springs to the seating, and means for adjustably connecting the outer ends of said inclined springs to the said frame.

5. A spring bed or seat comprising in combination a frame composed of longitudinal and end members, a seating therefor, plate links having opposite ends inclined toward the seating, inclined springs arranged in pairs and directly connected to the said inclined ends of said plate links and also connected to said seating, and adjusting screws passing through said plate links and directly securing them to the frame.

6. A spring bed or seat comprising in combination a frame composed of longitudinal and end members, a seating therefor, springs arranged in pairs and connected to said seating, the members of each pair being inclined toward each other, a single plate link to which the outer ends of the members of each pair of springs are connected, the ends of said plate links being inclined in substantially the plane of inclination of said springs, and adjusting screws passing through said plate links and screwing them to said frame.

7. A spring bed or seat comprising in combination a frame composed of longitudinal and end members, a seating therefor, springs arranged in pairs, the members of each pair inclining toward each other outwardly, a single plate link to which the outer ends of each pair of springs is connected, a screw directly connecting each plate link and the frame, and hooks engaging the seating and to which the inner ends of adjacent members of adjacent pairs of said springs are connected.

In testimony whereof, I have signed my name to this specification, in the presence of two subscribing witnesses.

ISAAC E. PALMER.

Witnesses:
FRED. E. FOWLER,
CHAS. M. LAUER.